(12) United States Patent
Torriani et al.

(10) Patent No.: US 10,059,076 B2
(45) Date of Patent: *Aug. 28, 2018

(54) METHOD OF FASTENING AN EDGE STRUCTURE TO A CONSTRUCTION ELEMENT

(71) Applicant: Woodwelding AG, Stansstad (CH)

(72) Inventors: Laurent Torriani, Lamboing (CH); Mario Lehmann, Les Pommerats (CH); Marcel Aeschlimann, Ligerz (CH)

(73) Assignee: WOODWELDING AG, Stansstad (CH)

( * ) Notice: Subject to any disclaimer, the term of this patent is extended or adjusted under 35 U.S.C. 154(b) by 326 days.

This patent is subject to a terminal disclaimer.

(21) Appl. No.: 14/939,382

(22) Filed: Nov. 12, 2015

(65) Prior Publication Data

US 2016/0114550 A1    Apr. 28, 2016

Related U.S. Application Data

(63) Continuation-in-part of application No. 14/066,136, filed on Oct. 29, 2013, now Pat. No. 9,205,627, which
(Continued)

(30) Foreign Application Priority Data

Oct. 28, 2008  (CH) ...................... 1690/08

(51) Int. Cl.
    *B32B 37/00*    (2006.01)
    *B32B 3/08*    (2006.01)
    (Continued)

(52) U.S. Cl.
    CPC ................ *B32B 3/08* (2013.01); *B27D 5/003* (2013.01); *B29C 63/0026* (2013.01);
(Continued)

(58) Field of Classification Search
CPC ... B29C 65/08; B29C 65/645; B29C 63/0026; B29C 66/112; B29C 66/114;
(Continued)

(56) References Cited

U.S. PATENT DOCUMENTS

| 3,595,237 A | 7/1971 | Sargent et al. |
|---|---|---|
| 4,244,069 A | 1/1981 | Hale |

(Continued)

FOREIGN PATENT DOCUMENTS

| DE | 202006010157 | 11/2007 |
|---|---|---|
| EP | 1640128 | 3/2006 |

(Continued)

*Primary Examiner* — James Sells
(74) *Attorney, Agent, or Firm* — Rankin, Hill & Clark LLP (57) ABSTRACT

A method of fastening an edge structure to a construction element includes providing the construction element, being a planar structure with with two cover regions and a middle region between the cover regions; providing the edge structure being continuously extended, the edge structure having contact surfaces with a thermoplastic material shaped to lie against the cover regions in an outer surface of the construction element, and, opposite the contact surfaces, a coupling-in surface for coupling energy into the edge structure; coupling energy into the edge structure and pressing the contact surfaces against the cover regions until at least a portion of the thermoplastic material is liquefied and pressed into the cover regions; and repeating or continuing the steps of coupling and pressing until the edge structure is attached to the building element at a plurality of discrete locations or over an extended region along an edge of the construction element.

19 Claims, 9 Drawing Sheets

Related U.S. Application Data is a continuation of application No. 13/126,005, filed as application No. PCT/CH2009/000343 on Oct. 27, 2009, now Pat. No. 8,597,446.

(51) Int. Cl.

| | | |
|---|---|---|
| *B29C 65/08* | (2006.01) | |
| *B27D 5/00* | (2006.01) | |
| *B29C 65/64* | (2006.01) | |
| *B29C 63/00* | (2006.01) | |
| *B29L 31/10* | (2006.01) | |
| *B29K 707/04* | (2006.01) | |
| *B29L 31/44* | (2006.01) | |
| *B29K 311/12* | (2006.01) | |
| *B29C 65/00* | (2006.01) | |
| *B29K 23/00* | (2006.01) | |
| *B29K 27/06* | (2006.01) | |
| *B29K 55/02* | (2006.01) | |
| *B29K 69/00* | (2006.01) | |
| *B29K 77/00* | (2006.01) | |
| *B29K 311/14* | (2006.01) | |
| *B29K 101/12* | (2006.01) | |
| *B29L 31/60* | (2006.01) | |
| *B29K 709/08* | (2006.01) | |
| *B29K 105/12* | (2006.01) | |

(52) U.S. Cl.
CPC ........... *B29C 65/08* (2013.01); *B29C 65/645* (2013.01); *B29C 66/112* (2013.01); *B29C 66/114* (2013.01); *B29C 66/126* (2013.01); *B29C 66/1222* (2013.01); *B29C 66/1224* (2013.01); *B29C 66/21* (2013.01); *B29C 66/30223* (2013.01); *B29C 66/534* (2013.01); *B29C 66/5346* (2013.01); *B29C 66/61* (2013.01); *B29C 66/72525* (2013.01); *B29C 66/7392* (2013.01); *B29C 66/73161* (2013.01); *B29C 66/7486* (2013.01); *B29C 66/7487* (2013.01); *B29C 66/8322* (2013.01); *B29C 66/30221* (2013.01); *B29C 66/30326* (2013.01); *B29C 66/3452* (2013.01); *B29C 66/472* (2013.01); *B29C 66/71* (2013.01); *B29C 66/7212* (2013.01); *B29K 2023/06* (2013.01); *B29K 2023/12* (2013.01); *B29K 2027/06* (2013.01); *B29K 2055/02* (2013.01); *B29K 2069/00* (2013.01); *B29K 2077/00* (2013.01); *B29K 2101/12* (2013.01); *B29K 2105/12* (2013.01); *B29K 2311/12* (2013.01); *B29K 2311/14* (2013.01); *B29K 2707/04* (2013.01); *B29K 2709/08* (2013.01); *B29L 2031/10* (2013.01); *B29L 2031/44* (2013.01); *B29L 2031/608* (2013.01); *B32B 2479/00* (2013.01); *B32B 2605/00* (2013.01); *B32B 2607/00* (2013.01); *Y10T 428/239* (2015.01); *Y10T 428/24008* (2015.01)

(58) Field of Classification Search
CPC ............ B29C 66/1222; B29C 66/1224; B29C 66/126; B27D 5/003; B32B 3/08
USPC ....................................................... 156/73.1
See application file for complete search history.

(56) References Cited

U.S. PATENT DOCUMENTS

| | | | |
|---|---|---|---|
| 4,374,187 | A | 2/1983 | Sano |
| 4,459,793 | A | 7/1984 | Zenger |
| 4,466,553 | A | 8/1984 | Zenger |
| 4,663,912 | A | 5/1987 | Vinther |
| 4,722,146 | A | 2/1988 | Kemeny |
| 4,748,970 | A | 6/1988 | Nakajima |
| 4,761,319 | A | 8/1988 | Kraus et al. |
| 4,765,105 | A | 8/1988 | Tissington et al. |
| 4,782,968 | A | 11/1988 | Hayes |
| 4,948,006 | A | 8/1990 | Okabe et al. |
| 5,580,097 | A | 12/1996 | Latvakangas et al. |
| 5,743,204 | A | 4/1998 | Tweet |
| 5,853,577 | A | 12/1998 | Gizowski et al. |
| 5,950,389 | A | 9/1999 | Porter |
| 5,965,238 | A | 10/1999 | Saitoh |
| 6,029,416 | A | 2/2000 | Andersson |
| 6,131,521 | A | 10/2000 | Nelson et al. |
| 6,183,585 | B1 | 2/2001 | Kelley |
| 6,233,896 | B1 | 5/2001 | Coup |
| 6,479,006 | B1 | 11/2002 | Kaufmann |
| 6,490,828 | B1 | 12/2002 | Fuller et al. |
| 6,502,341 | B1 | 1/2003 | Truc |
| 6,607,798 | B1 | 8/2003 | Watanabe |
| 6,786,007 | B2 | 9/2004 | Aritake |
| 6,982,021 | B2 | 1/2006 | Spengler |
| 7,658,810 | B2 | 2/2010 | Endres et al. |
| 7,892,631 | B2 | 2/2011 | Bauer |
| 8,176,704 | B2 | 5/2012 | Gauss |
| 8,230,659 | B2 | 7/2012 | Langille et al. |
| 8,426,006 | B2 | 4/2013 | de Groot |
| 8,597,446 | B2 * | 12/2013 | Torriani ............. B29C 63/0026 156/308.2 |
| 8,945,327 | B2 | 2/2015 | Stamp et al. |
| 9,205,627 | B2 * | 12/2015 | Torriani ............. B29C 63/0026 |
| 2003/0041955 | A1 | 3/2003 | Spengler |
| 2003/0163972 | A1 | 9/2003 | Angenendt et al. |
| 2003/0188491 | A1 | 10/2003 | Aritake |
| 2006/0046139 | A1 | 3/2006 | Suzuki et al. |
| 2006/0210777 | A1 | 9/2006 | Bauer |
| 2007/0125601 | A1 | 6/2007 | Lutze |
| 2008/0201938 | A1 | 8/2008 | Gauss et al. |
| 2010/0129584 | A1 | 5/2010 | de Groot |
| 2011/0314755 | A1 | 12/2011 | Langille et al. |
| 2012/0315429 | A1 | 12/2012 | Stamp et al. |
| 2013/0236688 | A1 | 9/2013 | Stamp et al. |

FOREIGN PATENT DOCUMENTS

| | | |
|---|---|---|
| EP | 1698738 | 9/2006 |
| EP | 1731236 | 12/2006 |
| EP | 1932637 | 6/2008 |
| EP | 1961533 | 8/2008 |

\* cited by examiner

METHOD OF FASTENING AN EDGE STRUCTURE TO A CONSTRUCTION ELEMENT

BACKGROUND OF THE INVENTION

Field of the Invention

The invention relates industrial fastening techniques such as used in construction, such as lightweight construction, machine construction, automotive and aircraft construction and furniture industry.

Description of Related Art

Lightweight building boards consist of two outer, relatively thin cover layers, for example particleboards, and a filling, for example a honeycomb structure made of card, arranged between the cover layers. Lightweight building boards of this type are mechanically very stable, lightweight, and can look attractive if the edges are finished neatly. Specifically because of their low weight and also because of the low consumption of resources in their production, they are becoming increasingly popular.

Edges (decorative edges) for such lightweight building boards are, for example, plastic strips sealed on the outer surface and provided with a suitable decoration, and may furthermore be provided with an adhesive on the rear side. Decorative edges formed as veneer edges are also available.

However, finishing the edges in such a way as to obtain an attractive appearance has, to some extent, not yet been satisfactorily accomplished. In particular for the production of ready-made and mass-produced products, it would be desirable if a cut-to-size lightweight building board could be provided with an edge by a craftsman after the cutting-to-size operation, without involving great effort and using available tools.

For the secure fastening of the edge, the prior art discloses on the one hand the provision of a so-called crosspiece, that is a particle profile completely filling the intermediate space between the cover layers in the region of the edge. A commercially available edge of the desired type can then be adhesively attached to such a crosspiece. Such crosspieces are mechanically very stable. However, they contribute significantly to the overall weight of the board and can only be retrofitted with considerable effort. They are therefore suitable in particular for fitting at the time that the lightweight building board is made, and consequently particularly for industrial production.

On the other hand, so-called support edges are known. These are plastic strips or plastic laths which are attached to the edge between the cover layers, the cover layers generally also being milled on the inside. The actual edge with the decoration is then glued onto this support edge. The document EP 1 640 128 shows as a method in which the edge is glued onto the support edge before the support edge is attached.

The support edge technique is also quite laborious and necessitates the use of machines especially provided for the support edges. For anything other than industrial production, their use entails disadvantages and is even virtually impossible.

Other lightweight construction elements comprise sandwich boards of composite cover layers and filling layers of a suitable material, such as a foam (metal foam, polymeric foame, etc.). Also for these materials, there exists the challenge of efficiently and reliably attaching an edge structure to the construction element.

Similar problems arise if a construction element does not have discrete, distinct layers (cover layers, filling layer) but is composed of a material composition having a continuous density profile, with denser outer regions and a less dense inner region. An edge structure may be desireable also for such construction elements, for aesthetic reasons and/or for protection, for example against humidity.

SUMMARY OF THE INVENTION

It is consequently an object of the invention to provide a method for producing a construction component, especially lightweight component and a support element intended for such a method that overcome disadvantages of the prior art and, in particular, are suitable for industrial production or for non-industrial production or both.

According to one aspect of the invention, method of fastening an edge structure to a construction element is provided, the the method comprising the steps of:
  providing the construction element, being a planar structure with with two cover regions and a middle region between the cover regions, wherein a material density in the cover regions is larger than in the middle region;
  providing the edge structure being continuously extended, the edge structure comprising contact surfaces with a thermoplastic material shaped to lie against the cover regions in an outer surface of the construction element, and, opposite the contact surfaces, a coupling-in surface for coupling energy into the edge structure;
  coupling energy into the edge structure and pressing the contact surfaces against the cover regions until at least a portion of the thermoplastic material is liquefied and pressed into the cover regions; and
  repeating or continuing the steps of coupling and pressing until the edge structure is attached to the lightweight building element at a plurality of discrete locations or over an extended region along an edge of the construction element.

Due to this approach of fastening the edge structure to the cover regions—and not primarily to the middle region, the energy impact is minimized and the achievable production speed is enhanced compared to approaches that comprise planar attaching of an edge structure. The enhanced stability of the cover regions is used, and due to the fastening to both cover regions, a dense and neat connection results.

According to the first aspect, the supplying of energy may take place by a sonotrode, through which vibrations are coupled into the edge structure. The vibrations can be coupled into the edge structure in such a way that they are transmitted through the latter to an interface with the cover regions and the liquefaction takes place as a result of the friction between the cover region and the thermoplastic material and/or internal friction of the thermoplastic material (for example assisted by energy directors) in the region of the interface with the cover regions. As a variant, the liquefaction may also be brought about in contact with a counter element, which may, for example, engage behind an edge structure in an L-shaped manner and with which the pressure of the sonotrode is opposed The supplying of energy may alternatively also be brought about in some other way, mechanically, by heating or by radiation coupled in for example through the edge support, which is absorbed at the roughened or for some other reason absorbent interface between the edge support and the cover region.

Terms concerning the spatial orientation such as "horizontal" or "vertical", "upper side", "underside", etc. are used in the present text to make it easier to read. They relate to the construction element when it has been placed with a flat side on a planar surface, with the cover regions horizontal. They should not of course be interpreted as meaning that the method described only works in this orientation. It goes without saying that—particularly for relatively small construction elements—it can also be carried out, for example, with the construction element oriented vertically or with the construction element held at an angle.

The procedure according to the invention produces the important advantage that it allows the use of a relatively low-cost element—the edge structure—which can also be used with simple means—that is, for example, an ultrasonic device with a sonotrode. The ultrasonic device with the sonotrode may be a portable device ('handheld device') or a device similar to a fixedly installed drilling machine carried by a frame, with which it is possible to carry out not only the fastening of the edge support but also other working steps. The ultrasonic device may also be a customary stationary ultrasonic machine, as also known for industrial applications; the procedure according to the invention is also suitable for industrial application.

The procedure according to the invention also makes it possible that the filling in the region of the narrow side does not have to be cleared out—and is preferably used as such. Even if it comprises regions running between the cover regions in the final state, the edge structure requires little depth, and, given sufficiently flexible filling material, said material can be readily forced in.

Furthermore, the invention makes it possible that the cover regions do not have to be pretreated—for example by providing channels, grooves, etc.—i.e. the at least one edge structure may be fastened after the cutting-to-size operation, without method steps that are specifically designed for the edge structure, although such steps are not ruled out.

During the anchorage of the edge structure, a supporting force that is directed inward—that is to say toward the other cover region respectively—may be exerted on the cover region or the cover regions. Such a supporting force prevents the cover regions from coming apart when the supporting edges are introduced; this helps, inter alia, to maintain the thickness tolerances of the lightweight building board.

In embodiments, the sonotrode acts from the narrow side, therefore does not act through the cover regions.

Following the anchorage, a material-removing working step may be performed in order to ensure a smooth finish toward the narrow side, it being possible for material of the cover regions and/or the edge structure(s) to be removed.

The sonotrode will drive the edge support against the end sides of the cover regions and between the cover regions, while at the same time coupling in mechanical oscillations, by a pressing force in the horizontal direction—i.e. application of force parallel to the plane of the cover regions. The liquefaction of the thermoplastic material in this case takes place at the end sides against the cover region or the cover regions and/or by friction on the inner surface of the cover regions.

According to one specific embodiment, the rear support comprises a guiding portion, which already lies between the cover regions when the rear support is put in place and before the mechanical oscillations are coupled in, to be precise in such a way that it is in surface-area contact with the inside of both cover regions and thereby acts in a guiding manner during further pressing in by the sonotrode. The guiding portion protrudes beyond contact surfaces with the cover regions into the region between the cover regions (i.e. possibly into the region of the filling).

In order that the mechanical oscillations can be coupled into the edge structure, the latter has a corresponding coupling-in surface. In the case of the embodiments mentioned above, with the pressing force in the horizontal direction, this coupling-in surface lies on the rear side (that is to say proximally) and is substantially vertical, and for example approximately parallel to the extent of the narrow side.

According to an alternative embodiment, the pressing force is not exerted horizontally, but vertically by the sonotrode. If that is the case, the sonotrode has a portion which protrudes into the space between the cover regions during the anchoring process. By contrast with the preferred situation when anchorage is effected by a horizontal force—the anchorage in the upper and lower cover regions then does not takes place simultaneously but successively. This embodiment is most particularly preferred in conjunction with edge supports running in the manner of a zigzag or network.

In the case of these embodiments with a vertical pressing force, during the anchoring process the coupling-in surface lies in the interior of the region between the cover regions, and, for example, lies approximately horizontally.

BRIEF DESCRIPTION OF THE DRAWINGS

Embodiments of the invention are described in detail below on the basis of drawings. The drawings are schematic and not to scale. In the drawings, the same designations refer to the same or analogous elements and.

DETAILED DESCRIPTION OF THE INVENTION

In the illustrative examples of FIGS. 1-8b, the construction element is a lightweight building board, and the edge structure is an edge support for fastening an edge, such as a decorative edge thereto.

The cut-to-size lightweight building board that can be seen in FIGS. 1a-1d comprises—as also in the embodiments described below—an upper cover layer 1.1 and a lower cover layer 1.2. The cover layers are produced from a derived timber material; for example, they are formed as particle boards, fiberboards or laminated (plywood) boards. The invention is also suitable, however, for the application where the cover layers are made of other materials, under some circumstances materials that are not wood-based, which have sufficient mechanical strength and dimensional stability and comprise structures that are suitable for interpenetration with liquefied thermoplastic material, for example plastic- or metal-based materials, in particular also composite materials.

The thickness of the cover layers may be chosen according to the applications. If the cover layers are made of a derived timber material, the thickness may be, in particular, 10 mm or less, for example between 2 mm and 8 mm, since for such thicknesses there is specifically a need for the edge to be supported.

Arranged between the cover layers is a filling 2. This consists of a material that is light in comparison with the cover layers, for example a honeycomb structure made of card or a similar material. Other fillings forming walls with cavities lying in between are also conceivable, for example regularly arranged strips (the lightweight component is then sometimes referred to as a "multi-wall sheet") or tubular structures. Furthermore, the use of Styropor or similar foams as well as, for example, aluminum honeycombs is also conceivable. Quite generally, the invention is not dependent on the type of filling and works irrespective of the nature of the filling.

Figure 1A:
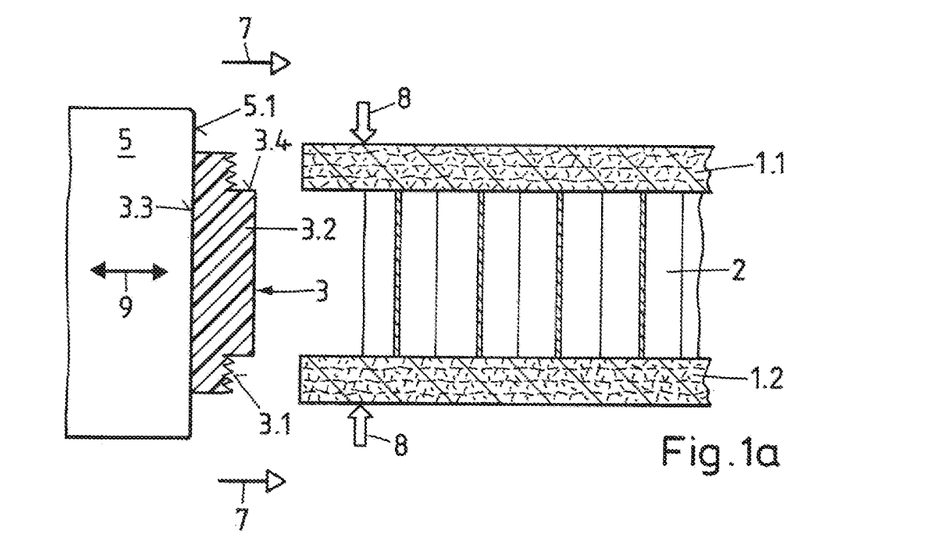
FIGS. 1a-d show a method according to the invention with a first embodiment of edge supports.
Figure 1B:
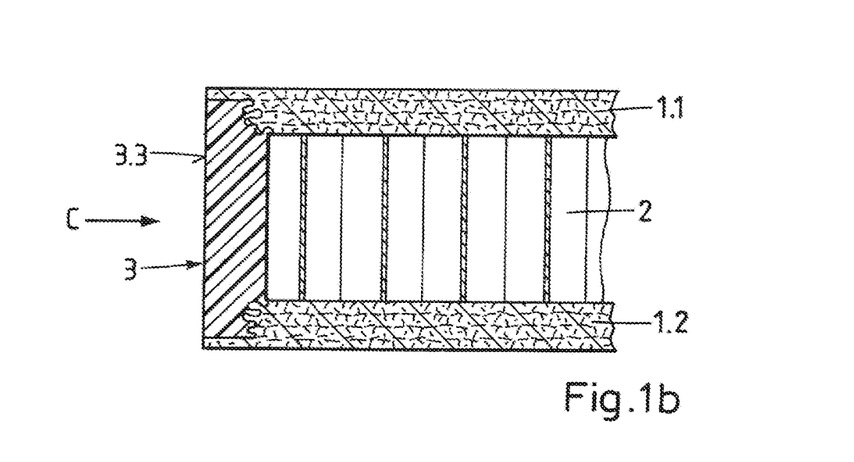
Figure 1C:
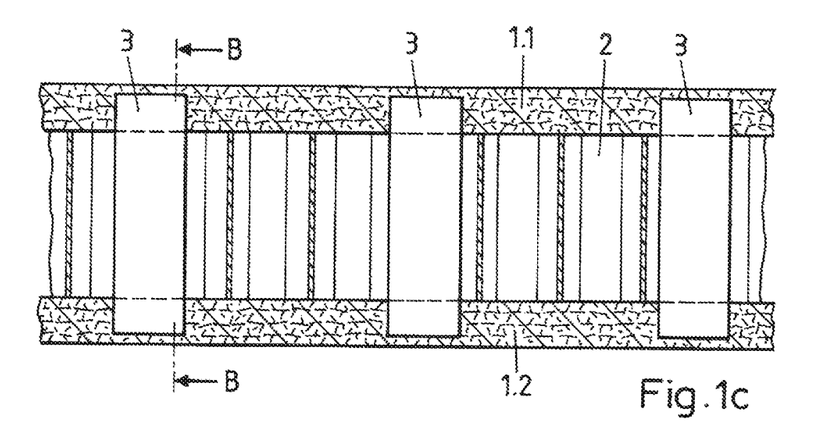
Figure 1D:
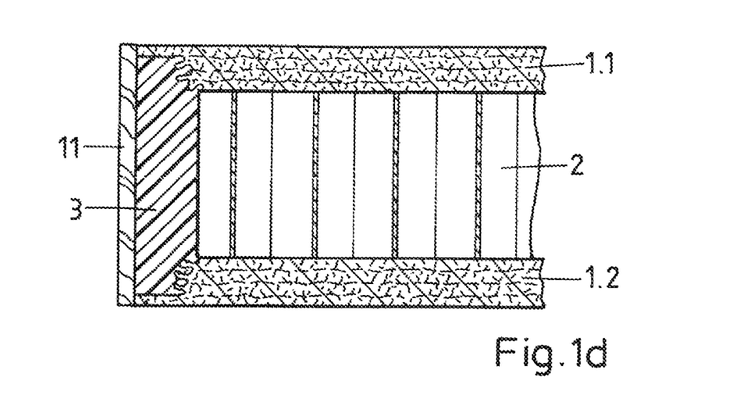

FIGS. 1a, 1b and 1d show sectional representations through a lightweight component during various method steps (corresponding to a section along the line B-B in FIG. 1c), and FIG. 1c shows a plan view (from the direction of the arrow C in FIG. 1b) of a region of the lightweight component during the method according to the invention.

An edge support 3 of the type depicted in FIG. 1a consists of a thermoplastic material, for example a polymer such as polyamide, a polycarbonate or a polyester carbonate, or else an acrylonitrile-butadiene-styrene (ABS), styrene acrylonitrile, polymethyl methacrylate, polyvinyl chloride, polyethylene, polypropylene and polystyrene. In addition to the thermoplastic polymer, the material may also comprise suitable fillers, for example reinforcing fibers, for example glass or carbon fibers. Quite generally, all materials with a sufficiently high strength, and sufficiently high modulus of elasticity of, for example, at least 0.5 GPa, that can be locally liquefied by ultrasound are suitable. These materials are generally the same materials that are also suitable for ultrasonic welding. To take an example, ABS is a particularly suitable material.

The edge support 3 has a vertical extent that is a little less than the thickness of the lightweight building board. At the contact surface 3.1 with the cover layers 1.1, 1.2, it comprises energy directors, which are formed for example as projecting corners or ridges tapering to an edge. Furthermore, formed in the region between the cover layers 1.1, 1.2 is a projecting guiding portion 3.2, the vertical extent of which corresponds to the distance between the cover layers 1.1, 1.2. A rear surface 3.3 (with respect to the lightweight board in the configuration of FIG. 1a) is substantially planar and suitable as a coupling-in surface for the mechanical oscillations. For the anchorage of the edge support 3 to the narrow side of the lightweight building board, the edge support is positioned on the narrow side and pressed against it (arrows 7). The pressing force is exerted by a sonotrode 5, the coupling-out surface 5.1 of which lies flat against the coupling-in surface 3.3. At the same time, an inwardly directed supporting force (arrows 8) is exerted on the cover layers 1.1, 1.2, and mechanical oscillations 9 are coupled into the edge support 3 through the sonotrode 5. The guiding portion 3.2 thereby ensures that the orientation of the edge support is defined and that no undesired tilting occurs during the subsequent melting.

The mechanical vibrations are, for example, ultrasonic oscillations. In general, oscillations in a frequency range between 2 kHz and 100 kHz, preferably between 10 kHz and 40 kHz, for example about 20 kHz, are used; other frequencies are not ruled out. The power of the device generating the oscillations—a commercially available ultrasonic device may be used—depends on the dimensionings; it may lie in the range between 100 W and 2 kW.

The pressing force 7 (and possibly the supporting force 8) may optionally be exerted already before the mechanical oscillations begin, in order to press the edge support 3 a little into the material of the cover layers already in the region of the contact surface 3.1, which in the subsequent step makes it even easier for the edge support to be guided and can ensure optimum introduction of the mechanical oscillations into the edge support. It is particularly favorable if the supporting force 8 is exerted already before the edge support is placed on, in order to ensure that the cover layers are kept fixed in position during the entire process.

As soon as the mechanical oscillations 9 are coupled in, mechanical energy is absorbed, in particular in the region of the contact surfaces—on account of the energy directors and the friction with the material of the cover layers—and as a result the liquefying of the thermoplastic material is initiated. The material begins to melt and is pressed into the cover layers 1.1, 1.2. At the same time, incipient melting of the thermoplastic material may also take place in the region of the horizontal supporting surfaces 3.4 of the guiding portion, on account of the friction with the cover layers.

After the mechanical oscillations end, the liquefied material sets again, and a stable positively engaging connection with the material of the cover layers is obtained. This is represented in FIG. 1b.

This anchoring process is carried out for a plurality of edge supports 3 along the narrow side, the edge supports preferably being arranged at regular intervals, which can be seen particularly well in FIG. 1c.

In this case, each edge support may be anchored individually, or a number of edge supports may be inserted simultaneously with the aid of an extended sonotrode, covering a number of edge supports.

This has the overall effect of producing an extended region of the narrow side, which is provided with edge supports in such a way that the edge 11 can be adhesively attached to the flat rear side 3.3, serving in the previous step as a coupling-in surface for the mechanical oscillations. This is illustrated in FIG. 1d.

Before the adhesive attachment of the edge, a milling or grinding of the narrow side—including the edge support— may possibly also take place, in order that the lightweight component has a smooth, regular surface in the region of the narrow side.

If an edge support 3 of the type represented in FIG. 1a is of a transparent configuration, electromagnetic radiation may be coupled into it instead of or in addition to mechanical vibrations, for example from the rear-side surface 3.3 into the region of the contact surfaces 3.1, the latter being configured by roughnesses, pigments or other means in such a way that the electromagnetic radiation is absorbed there. The absorption has the effect that the thermoplastic material in the region of the interface heats up, and ultimately liquefies, which with the simultaneous exertion of a pressing force 7 can likewise lead to the anchorage as represented in FIG. 1b.

Figure 2:
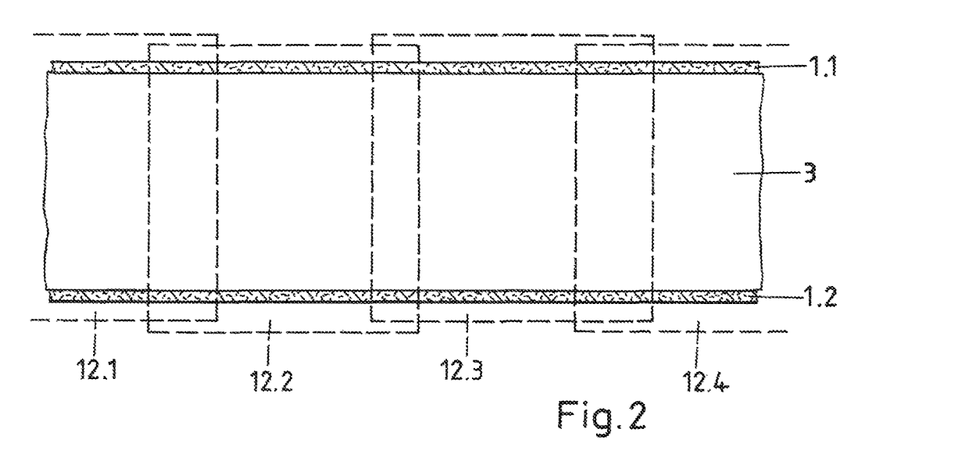
FIG. 2 shows a variant with an endless edge support.

FIGS. 1a to 1d illustrate the fastening of a plurality of discrete edge supports arranged at regular intervals. Instead, however, a continuous edge support ("endless edge support") may also be used. Such an edge support may, for example, comprise a cross section such as the cross section illustrated in Figure 1a of the discrete edge supports described above. It may be obtained in a continuous process with a sonotrode that is advanced in the manner of a roller or with a sonotrode that is moved over the rear side in the manner of a smoothing iron. However, a continuous edge support may also be fastened portion by portion by an iterative process, which is illustrated in FIG. 2. FIG. 2 shows a view analogous to FIG. 1c with a continuous edge support 3. The regions 12.1, 12.2, 12.3, 12.4, which are covered by the sonotrode during the anchoring, are represented by dashed lines. As depicted, they are chosen, for example, to be slightly overlapping.

As represented in FIG. 2, the continuous edge support may also comprise on the rear side a corresponding decoration and form the edge, in particular if the edge is in any case constructed as a laminate.

Figure 3A:
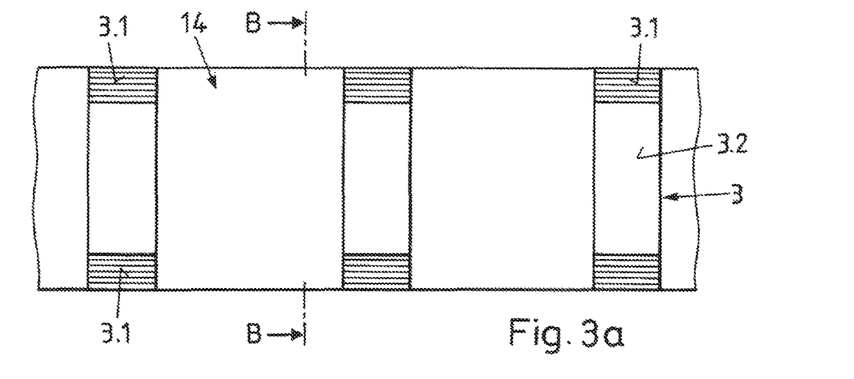
FIGS. 3a and 3b show a continuous strip provided with edge supports.
Figure 3B:
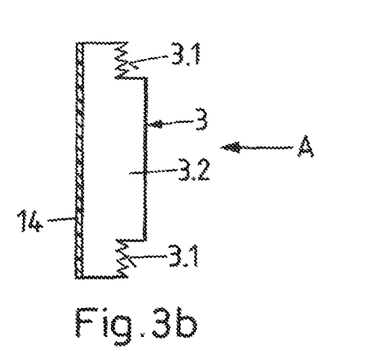

If, as in FIGS. 1a-1d, discrete edge supports are anchored, it may be of advantage if the edge supports 3 do not have to be placed individually but are supplied in a form in which they are fastened at the ideal intervals on a connecting element, for example a strip. This is illustrated in FIGS. 3a and 3b. FIG. 3a shows a front view—i.e. a view from the lightweight component side (arrow A in FIG. 3b)—of such an arrangement. FIG. 3b shows the representation of a section along the line B-B in FIG. 3a. The edge supports 3 in FIGS. 1a-1d of the type depicted are adhesively attached on the strip 14 or welded onto the strip. After the anchorage of the edge supports 3, the strip 14 may be pulled off in a process of the type described on the basis of FIGS. 1a to 1d, or it may also remain where it is, so that its rear side serves as an adhering location for the attachment of the edge 11. As a further alternative, the strip may be supplied in a relatively stable form and already be provided with the desired decoration on the rear side, so that it serves itself as the edge. If the connecting element does not serve as the edge, it does not have to be configured as a strip, but may, for example, also be a network, an assembly of a number of relatively narrow strips arranged next to one another or some other flexible connecting means defining the distances between the edge supports.

Figure 4:
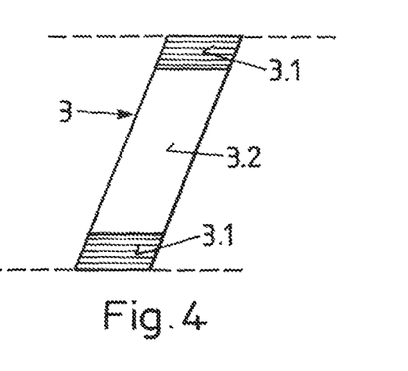
FIG. 4 shows an edge support placed at an angle.

The variant of the edge support depicted in FIG. 4 differs from those of FIGS. 1a-1d and 3a-3b in that, on account of its outer form and the form of the guiding portion, it is at an angle when it is placed in contact with the lightweight component. This has advantages in particular whenever, following the anchorage, the narrow side is also milled or ground. In the case of a straight arrangement—i.e. if the edge support is perpendicular on the flat sides—there is the risk of the edge support as a whole being caught by a milling or grinding head and, in the worst case, torn out. The angled position allows the head to act continuously on the edge support.

The angled position of the edge support also makes it possible for the edge to be supported over a greater length.

The variant according to FIG. 4 may optionally—as indicated by the dashed lines—likewise be pre-assembled on a strip.

Figure 5A:
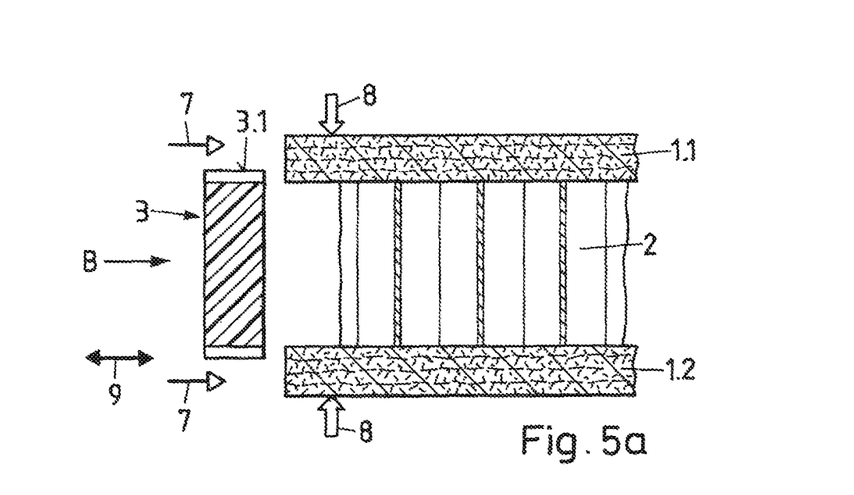
FIGS. 5a and 5b show a method according to the invention with a further embodiment of an edge support.
Figure 5B:
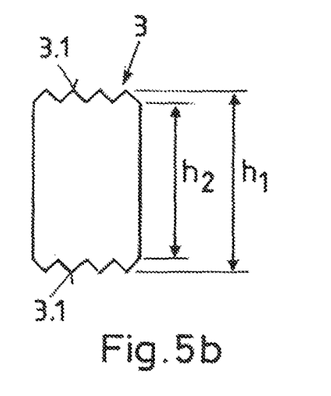

FIGS. 5a and 5b show an embodiment in which, in the anchored state, the contact surfaces 3.1 with the energy directors do not lie against the narrow side at the end but lie against the inside of the cover layers 1.1, 1.2 adjacent to the narrow side. An outer height $h_1$, i.e. the height measured between the edges or tips of the energy directors, is in this case dimensioned such that it is greater than the distance between the cover layers 1.1, 1.2. In other words, when the edge support 3 is inserted between the cover layers, the energy directors are against said cover layers, so that, as in the case of the examples described above, a horizontal pressing force 7 can be applied along the plane of the lightweight component. An inner height $h_2$, i.e. a height without the energy directors, may correspond approximately to the distance between the cover layers.

In the embodiment according to FIGS. 5a and 5b, the anchorage takes place primarily on the inside of the cover layers. The embodiment has the advantage that the edge support can disappear completely between the cover layers, i.e. pressing force 7 and mechanical oscillations 9 can be applied until the sonotrode is against the cover layers at the ends. In the case where the sonotrode is formed in such a way, the edge support can even be recessed just a little.

Even if in the case of the edge support of this embodiment there is no guiding portion projecting beyond the contact surface 3.1, the actual edge support body (i.e. the edge support without the energy directors) can act in a guiding manner during introduction if the inner height $h_2$ is chosen to correspond to the distance between the cover layers. This also applies if the edge support according to FIGS. 5a and FIG. 5b is formed at an angle by analogy with FIG. 4.

Also in the case of edge supports of this embodiment, a supporting force 8 is exerted on both cover layers. The supporting force 8 is especially important here, since the introduction of the edge support according to FIGS. 5a and 5b would have the tendency to push the two cover layers apart if no supporting force were present.

The embodiment according to FIGS. 5a and 5b—like that according to FIGS. 1a-1d—may also be brought about by the anchorage of individual edge supports, the anchorage of a number of edge supports connected to one another by a strip (or network or the like; a strip may optionally form the edge) or by the anchorage of a continuous edge support (with or without an edge).

It is a preferred principle of the invention that the sonotrode acts on the edge support from the narrow side—that is to say not through the cover layers. In the embodiments described above, the pressing force 7 acts from the end side, that is to say horizontally. An embodiment in which the sonotrode likewise acts on the edge support from the narrow side, but in which the pressing force is applied vertically, is described below on the basis of FIGS. 6a and 6b.

Figure 6A:
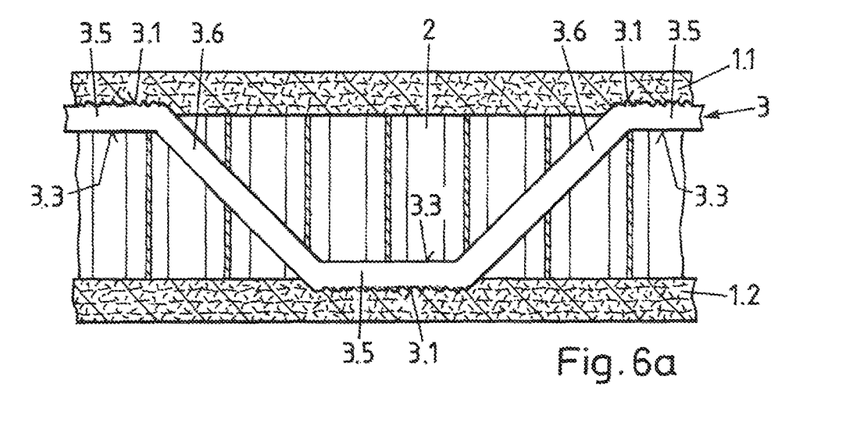
FIGS. 6a and 6b show a method according to the invention with yet another embodiment of an edge support.

FIG. 6a shows a view analogous to FIG. 1 c from the front side; FIG. 6b shows a sectional representation with a sonotrode. As can best be seen in FIG. 6a, the edge support 3 runs continuously, that is to say as in FIG. 2 as an "endless edge support". The edge support 3 comprises horizontal regions 3.5, which respectively lie with the contact surface 3.1 against one of the cover layers 1.1 and 1.2, as well as transitional regions 3.6 connecting these horizontal regions. The horizontal regions 3.5 are respectively located alternately on the inside of the upper cover layer 1.1 and of the lower cover layer 1.2.

Figure 6B:
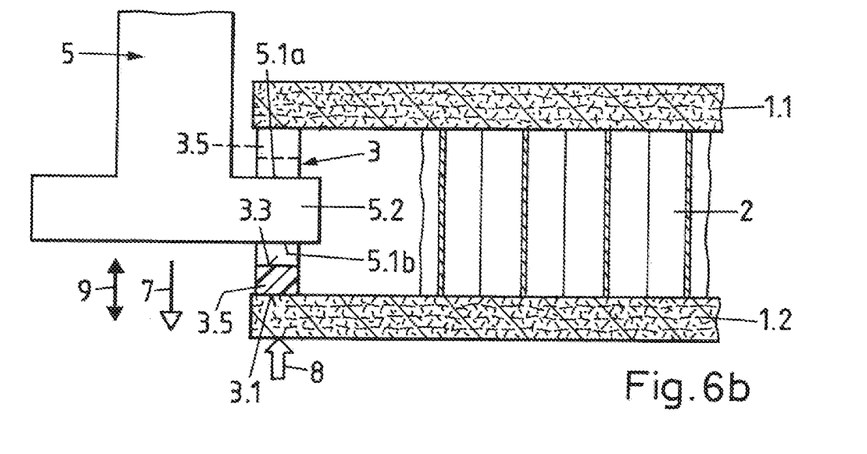

FIG. 6b illustrates how the edge support 3 according to FIG. 6a is anchored in the lightweight component. The sonotrode has the form of a T or L piece with a laterally protruding portion 5.2, which is inserted into the intermediate space between the cover layers 1.1, 1.2. The upper side 5.1a and the underside 5.1b of this portion form the coupling-out surfaces for the anchorage of an upper horizontal region 3.5 in the upper cover layer 1.1 and a lower horizontal region 3.5 in the lower cover layer. FIG. 6b illustrates the situation during the anchorage of a lower horizontal region 3.5. The pressing force 7 is downwardly directed. In this embodiment, the supporting force 8 is at the same time the counter force opposing the pressing force. In the case of the anchorage on the underside, it can be applied simply by the lightweight component resting on a horizontal underlying surface. In the case of the anchorage of the upper horizontal regions—with an upwardly directed pressing force—the counter force—then acting on the upper cover layer 1.1—is advantageously actively applied.

During the anchorage of the edge support 3, for example, upper and lower regions are anchored alternately along the narrow side. However, it is also possible, for example, first to anchor all the upper regions and then to anchor all the lower regions. Optionally, this may be accompanied by turning the lightweight component as a whole around. In the latter case, active application of the counter force may be made superfluous, in that during the anchoring there is always downward pressing and the supporting force can always be applied by the underlying surface against which the pressing force is directed.

The attachment of the edge with the decoration takes place by analogy with the above embodiments; here, too, a milling or grinding of the narrow side may take place in advance. This embodiment is even particularly suitable for this, since, as illustrated, the edge support can be anchored such that it is set back with respect to the end side of the cover layers. If it is done in this way, it is necessary for the cover layers to be removed until they are flush with the edge support, in order for adhesive attachment of the edge to become possible.

As a difference from the embodiments described above, however, in the case of the example according to FIGS. 6*a* and 6*b*, of course, the coupling-in surface does not serve as the rear-side surface for fastening the edge, but the outer surface.

Figure 7:
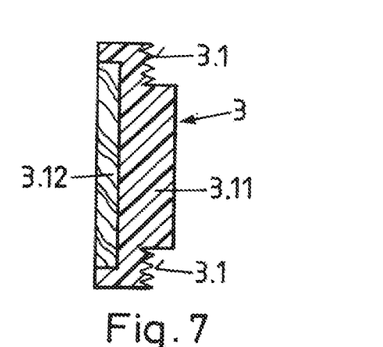
FIG. 7 shows a variant of an edge support with a hybrid structure.

Many other embodiments besides are conceivable, for example with network- or grid-like edge supports, differently formed sonotrodes, etc. It is also possible to construct the edge support from a number of materials and not just from one material, as in the examples illustrated above. FIG. 7 shows an edge support 3, which comprises, at least in the region of the contact surface 3.1, a thermoplastic part 3.11 and a non-thermoplastic part 3.12, for example of a building material containing wood. If such a part 3.12 is attached on the rear side, that may be particularly advantageous, for example, for the adhesive bonding with the edge.

Figure 8A:
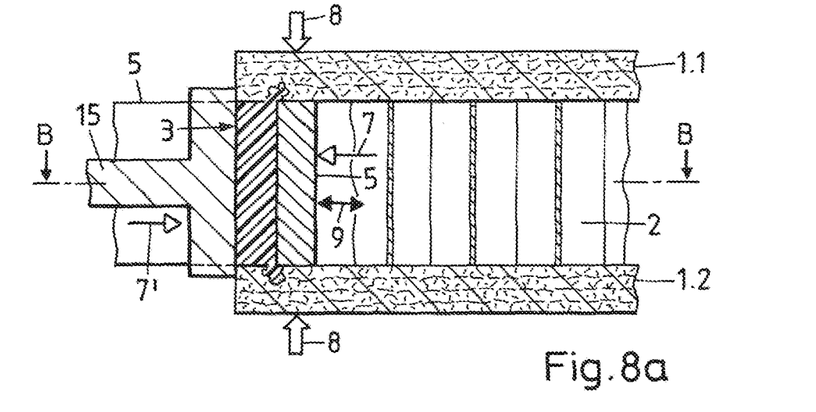
FIGS. 8a and 8b show a method with a further embodiment of edge supports in another configuration.
Figure 8B:
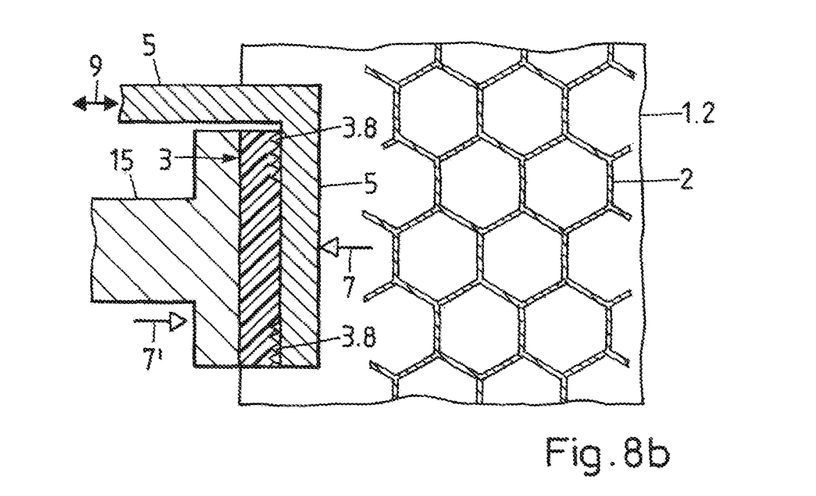

Depicted in FIGS. 8*a* and 8*b* is an arrangement in which the sonotrode 5 acts on the inside of the edge support 3 and exerts the pressing force 7 from the inside. FIG. 8*a* shows a sectional representation analogous to FIGS. 1*a*, 1*b*, 1*d*, 5*a* and 6*b*; FIG. 8*b* shows a section along the line B-B in FIG. 8*a*. The mechanical vibrations 9 are coupled into the sonotrode 5, which engages behind the edge support in an L-shaped manner. A counter element 15 is used to apply the necessary counter force 7'. The liquefaction takes place here in the region of the interface between the sonotrode 5 and the edge support 3, it being possible for the edge support to comprise energy directors 3.8, whereby the liquefaction reliably takes place directly at the interface on account of the vibrations coupled into the edge support. As indicated in FIG. 8*a*, on account of the pressing force, the liquefied thermoplastic material is displaced upward and downward and forced into structures of the cover layers, which brings about the anchorage. Even if the penetration of the cover layers with thermoplastic material will generally not be as intensive as when the edge support itself is pressed against the cover layer and liquefied in contact with it, even with this procedure sufficient anchorage can nevertheless be obtained.

In an arrangement that is virtually identical to FIGS. 8*a* and 8*b*, the mechanical vibrations can also be coupled into the edge support 3 from the outside, the liquefaction taking place in contact with the counter element. In such an arrangement, the roles of the sonotrode and of the counter element are changed over in FIGS. 8*a* and 8*b*, i.e. 15 then refers to the sonotrode and 5 refers to the counter element. The vibrations 9 are then coupled into the sonotrode 15; 7' refers to the pressing force and 7 refers to the counter force.

The method according to FIGS. 8*a* and 8*b* or the variant thereof can also be carried out by energy other than mechanical energy, for example heat, being coupled into the edge support. Instead of a sonotrode, a heating element is then used as the tool.

Figure 9:
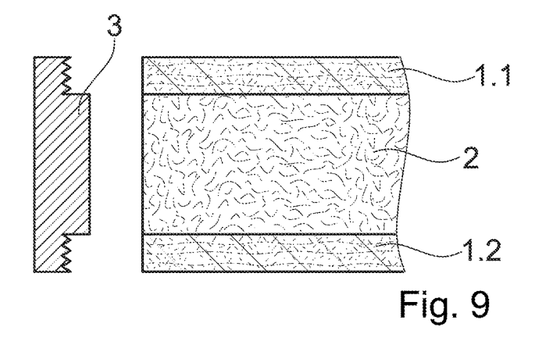
FIG. 9 shows a configuration similar to the configuration of FIG. 1a with a different construction element.

FIG. 9 shows an example of a sandwich material building element in which the cover layers 1.1, 1.2 are not of a timber-based material but of a synthetic material such as carbon-fiber reinforced polymer material. The middle layer 2 (or filling layer) is of a foam material, such as a deformable foam, for example a polyurethane foam or other foam of a synthetic material. Then, an edge structure 3 for example of the kind illustrated in FIG. 1*a* may optionally be fastened to the building element in the manner described referring to FIG. 1*a*/FIG. 1*b* without removing substantial amounts of middle layer material 2, with the guiding portion 3.2 causing a local displacement and deformation of the middle layer.

Alternatively, a middle layer material removal step may be carried out prior to the fastening, This alternative approach is also an option in case the middle layer 2 is of a material that is not substantially plastically or elastically deformable, such as of a metal foam (for example aluminium foam).

Figure 10:
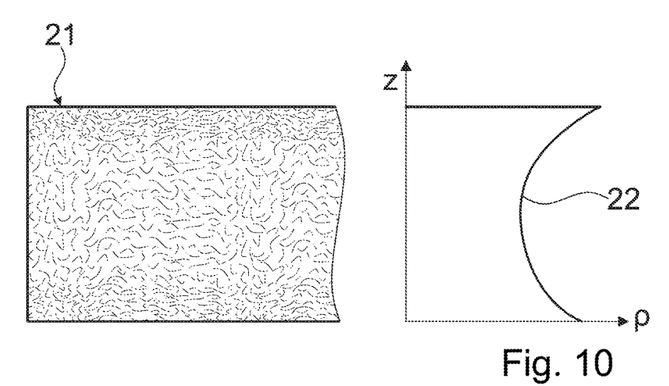
FIGS. 10, 11a and 11b show yet another construction element and a method of fastening an edge support thereto.

FIG. 10 illustrates a construction element 21 that does not have a sandwich structure but a continuous density $\rho$ profile 22 (right panel) as a function of the position z perpendicular to the construction element plane. Such a construction element may for example by a composite board that is harder and denser at the surfaces and softer and lighter in the interior.

To fasten an edge structure of the kind described for example referring to FIG. 1*a*, a sufficiently deep indentation (groove) running along the edge has to be made at locations corresponding to the guiding portion so that there is sufficient space for the guiding portion to protrude into, the depth has to be chosen such that it corresponds to the extension of the guiding portion relative to the contact surfaces plus the fastening path, i.e. the distance by which the edge structure is advanced relative to the construction element in the step of causing energy to impinge and pressing.

Figure 11A:
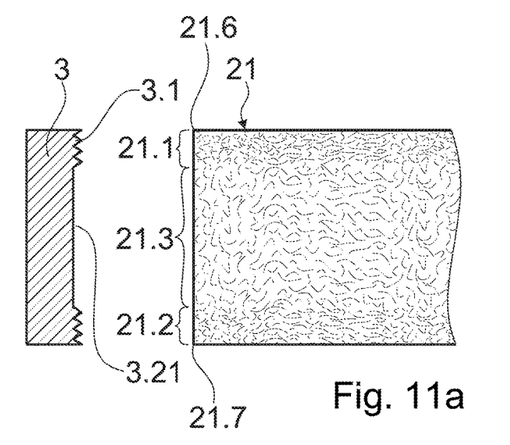
Figure 11B:
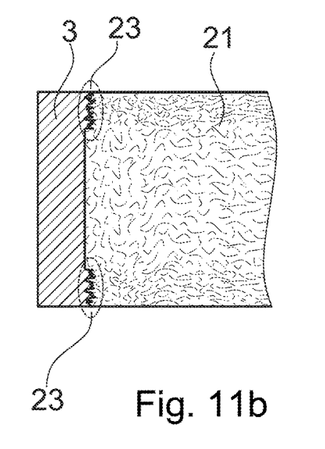

FIGS. 11*a* and 11*b* show an embodiment of fastening an edge structure 3 to the construction element. The edge structure comprises contact surfaces 3.1 with energy directors. Between the contact surfaces, the edge structure in the depicted embodiment instead of a guiding portion has a shallow indentation 3.21. Thereby, even if the construction element is plane along the edge and not subject to a special pre-treatment (FIG. 11*a*) the edge structure may be caused to be fastened to the construction element along the contact surfaces (FIG. 11*b*, showing zones 23 of interpenetration), whereas no fastening takes place along the middle region. Thereby, the contact surfaces 3.1 define the extension of the cover regions 21.1, 21.2 (because of the continuous density profile, there is no clear separation plane between the cover regions and the middle region defined by the construction element 21 itself).

The step of pressing and causing energy to impinge may be carried out until the ground of the shallow groove 3.21 abuts against the surface of the construction element, or may stop before this is the case. In the former case, the ground thereby serves as stop face, with no or comparably little energy being absorbed at the interface because no energy directing elements are present. In either case, a solid and dense connection along the upper and lower brinks 21.6, 21.7 results.

In addition or as an alternative to the edge structure 3 comprising an indentation, the construction element 21 may be provided with an indentation 21.5, so that the edge structure is not in contact with the middle region 21.3 during an initial stage of the pressing and coupling energy into the edge structure.

Figure 12A:
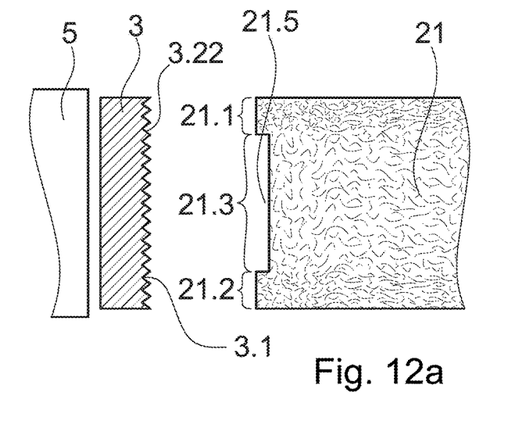
FIGS. 12a, 12b, 13, and 14 show further variants.
Figure 12B:
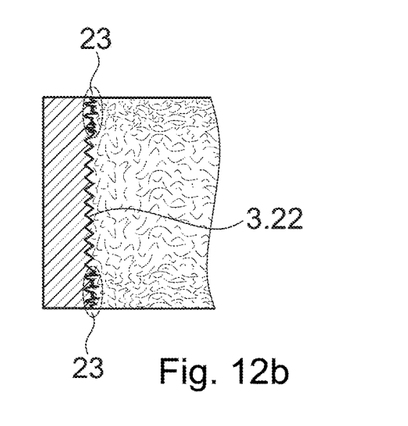
Figure 13:
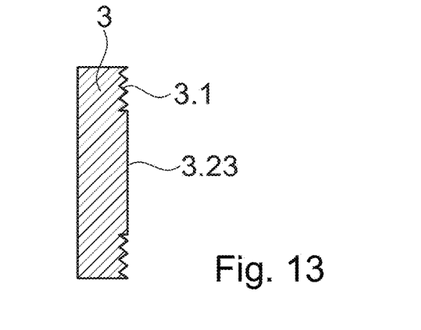

In the embodiment of FIG. 12*a*, the edge structure is shown with energy directors 3.22 along an entire out-of-plane extension of the edge structure. As an alternative, the energy directors could be confined to the contact surfaces 3.1, with a plane abutment surface 3.23 between the contact surfaces, as shown in FIG. 13.

Figure 14:
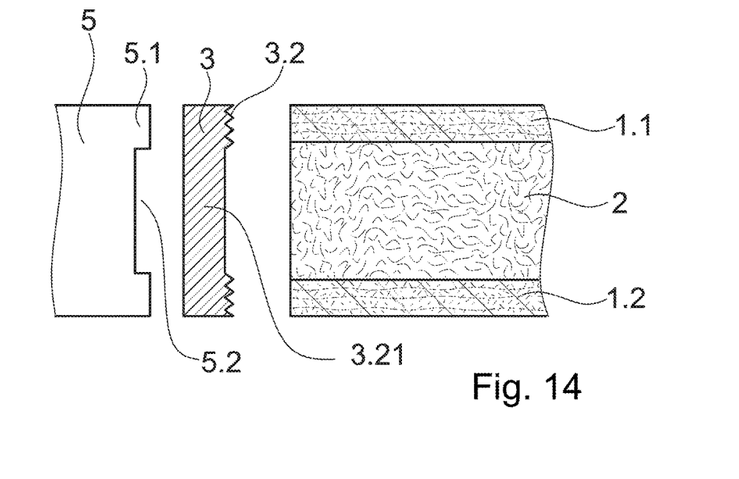

In the previously illustrated embodiments, the sonotrode 5 that couples the energy in the form of mechanical vibration energy into the edge structure is assumed to be flat with a plane or roller-like outcoupling structure. FIG. 14 shows an alternative version with the sonotrode 5 comprising protrusions 5.1 at the places of the contact surfaces 3.1, and an indentation 5.2 between the protrusions. In this, the protrusions may be sliding protrusions or features of a rolling sonotrode.

The protrusions serve as an additional or alternative measure for ensuring that the edge structure 3 is pressed against the cover regions and not or only to a lesser extent against the coupling energy into the edge structure and pressing the contact surfaces against the cover regions middle region 2, especially if the edge structure 3 is sufficiently flexible.

What is claimed is:

1. A method of fastening an edge structure to a construction element, the method comprising the steps of:
   providing the construction element, being a planar structure with with two cover regions and a middle region between the cover regions, wherein a material density in the cover regions is larger than in the middle region;
   providing the edge structure being continuously extended, the edge structure comprising contact surfaces with a thermoplastic material shaped to lie against the cover regions in an outer surface of the construction element, and, opposite the contact surfaces, a coupling-in surface for coupling energy into the edge structure;
   coupling energy into the edge structure and pressing the contact surfaces against the cover regions until at least a portion of the thermoplastic material is liquefied and pressed into the cover regions; and
   repeating or continuing the steps of coupling and pressing until the edge structure is attached to the lightweight building element at a plurality of discrete locations or over an extended region along an edge of the construction element.

2. The method according to claim 1, wherein the step of coupling energy into the edge structure comprises coupling mechanical vibration into the edge structure.

3. The method according to claim 1, wherein continuing the steps of coupling and pressing comprises moving along the edge a roller capable of coupling energy into the edge structure through the coupling-in surface.

4. The method according to claim 1, wherein continuing the steps of coupling and pressing comprises moving along the edge a flat tool capable of coupling energy into the edge structure through the coupling-in surface.

5. The method according to claim 1, wherein repeating the steps of coupling and pressing comprises repeatedly pressing a tool capable of of coupling energy into the edge structure through the coupling-in surface against regions of the edge.

6. The method according to claim 5, wherein the regions of the edge are overlapping.

7. The method according to claim 1, and causing the edge structure to not be pressed against the middle region during the step of coupling and pressing or pressed against the middle region by a substantially smaller pressing force than against the cover regions.

8. The method according to claim 7, wherein the middle region comprises a deformable material, wherein the method comprises placing the edge structure relative to the construction element prior to the step of coupling and pressing, and wherein the middle region is caused to be deformed by the step of placing.

9. The method according to claim 7, wherein the middle region is indented along the outer surface of the construction element.

10. The method according to claim 7, wherein the edge structure is indented opposite the middle region.

11. The method according to claim 7, wherein the step of coupling energy into the edge structure comprises coupling mechanical vibration into the edge structure by a sonotrode, and wherein the sonotrode is indented along the middle region.

12. The method according to claim 7, and causing the edge structure to be at a distance from the middle region at least during an initial stage of the step of coupling energy into the edge structure and pressing the contact surfaces against the cover regions.

13. The method according to claim 1, wherein the construction element is sandwich element with the cover regions being constituted by cover layers of a first material composition and the middle region being constituted by a filling layer of a second material composition.

14. The method according to claim 13, wherein the construction element is a board element with a material composition with a density continuously varying from a first one of the cover regions to the middle region and from the middle region to a second one of the cover regions.

15. The method according to claim 1, wherein the edge structure is free of elements protruding beyond the cover regions.

16. A continuous edge structure for a construction element, wherein:
   the construction element is a planar structure with two cover regions and a middle region between the cover regions, wherein a material density in the cover regions is larger than in the middle region;
   wherein the edge structure comprises contact surfaces with a thermoplastic material shaped to lie against the cover regions in an outer surface of the lightweight building element and further comprises, opposite the contact surfaces, a coupling-in surface for coupling mechanical vibration energy into the edge structure by a sonotrode;
   the edge structure is shaped so that at least a portion of the thermoplastic material is liquefied and pressed into the cover regions when energy is coupled into the edge structure while the contact surfaces are pressed against the cover regions by the sonotrode pressing against the coupling-in surface while subject to mechanical vibrations; and,
   the edge structure is continuously extended to run along an edge of the construction element.

17. The edge structure according to claim 16 being indented opposite the middle region.

18. The edge structure according to claim 17, wherein the contact surfaces comprise energy directing structures.

19. The edge structure according to claim 16 being an endless edge structure configured to be extend continuously along the outer surface and to be cut to size adapted to an extension of the construction element.

* * * * *